US010436209B1

(12) United States Patent
Pinera et al.

(10) Patent No.: US 10,436,209 B1
(45) Date of Patent: Oct. 8, 2019

(54) TURBOCHARGER WITH AIR JOURNAL BEARING AND THRUST BEARING

(71) Applicant: Florida Turbine Technologies, Inc., Jupiter, FL (US)

(72) Inventors: Alex Pinera, Jupiter, FL (US); Stephen M Brooks, Jupiter, FL (US)

(73) Assignee: FLORIDA TURBINE TECHNOLOGIES, INC., Jupiter, FL (US)

( * ) Notice: Subject to any disclaimer, the term of this patent is extended or adjusted under 35 U.S.C. 154(b) by 278 days.

(21) Appl. No.: 15/429,212

(22) Filed: Feb. 10, 2017

(51) Int. Cl.
| | |
|---|---|
| F04D 29/051 | (2006.01) |
| F04D 29/056 | (2006.01) |
| F04D 29/66 | (2006.01) |
| F01D 25/16 | (2006.01) |
| F16C 32/06 | (2006.01) |

(52) U.S. Cl.
CPC ........... F04D 29/051 (2013.01); F01D 25/16 (2013.01); F04D 29/056 (2013.01); F04D 29/668 (2013.01); F16C 32/0622 (2013.01); F16C 32/0677 (2013.01); F16C 32/0696 (2013.01); F05D 2220/40 (2013.01); F16C 2360/24 (2013.01)

(58) Field of Classification Search
CPC .. F04D 29/051; F04D 29/0513; F04D 29/056; F04D 29/0563; F04D 29/057; F04D 29/059; F04D 29/041; F04D 29/0413; F04D 29/046; F04D 29/0462; F04D 29/047; F04D 29/0473; F04D 29/0476; F04D 29/049; F04D 29/661; F04D 29/662; F04D 29/668; F01D 25/16–25/168; F01D 25/125; F01D 25/166; F01D 25/186; F01D 25/22; F05D 2220/40; F05D 2240/50–2240/54; F05D 2240/52; F05D 2240/53; F16C 32/0622; F16C 32/0677; F16C 32/0696; F16C 2360/24; F16C 17/18; F16C 32/0688
See application file for complete search history.

(56) References Cited

U.S. PATENT DOCUMENTS

| 3,017,230 | A | * | 1/1962 | Meermans | F01D 25/18 |
| | | | | | 184/6.11 |
| 4,285,632 | A | * | 8/1981 | DeSalve | F01D 25/18 |
| | | | | | 184/6.11 |
| 4,652,219 | A | * | 3/1987 | McEachern, Jr. | F01D 25/16 |
| | | | | | 384/518 |
| 4,708,602 | A | * | 11/1987 | McEachern, Jr. | F01D 25/164 |
| | | | | | 417/407 |

(Continued)

Primary Examiner — Bryan M Lettman
(74) Attorney, Agent, or Firm — John Ryznic

(57) ABSTRACT

A turbomachine such as a turbocharger with an air journal bearing and an air thrust bearing arrangement with a fixed air journal bearing connected in series with a floating air journal bearing connected by a hollow spring to supply compressed air from the fixed air journal bearing to the floating air journal bearing, and a forward air thrust bearing and an aft air thrust bearing connected in parallel to a source of compressed air. An air vent cavity is formed between the forward bearing and the aft bearing in which compressed air from all four bearings can be collected and discharged from a housing. Some of the compressed air from the forward thrust bearing is discharged with a compressor outlet, and some of the compressed air from the aft thrust bearing is discharged into a turbine inlet.

17 Claims, 11 Drawing Sheets

(56) References Cited

U.S. PATENT DOCUMENTS

| | | | | |
|---|---|---|---|---|
| 4,721,441 | A * | 1/1988 | Miyashita | F01D 25/164 384/518 |
| 4,808,091 | A * | 2/1989 | Ruetz | F01D 25/16 384/556 |
| 6,971,801 | B2 * | 12/2005 | Miyazaki | F16C 25/083 384/504 |
| 2007/0154126 | A1 * | 7/2007 | Ito | F16C 19/163 384/516 |
| 2007/0183704 | A1 * | 8/2007 | Umekawa | F01D 25/16 384/517 |
| 2012/0282078 | A1 * | 11/2012 | Marsal | F04D 29/059 415/1 |
| 2013/0259416 | A1 * | 10/2013 | Schmidt | F16C 19/184 384/490 |
| 2014/0041383 | A1 * | 2/2014 | Hauck | F04D 29/051 60/605.1 |
| 2014/0369865 | A1 * | 12/2014 | Marsal | F01D 25/16 417/406 |
| 2016/0298491 | A1 * | 10/2016 | Hettinger | F01D 25/18 |
| 2017/0058909 | A1 * | 3/2017 | Barber | F04D 29/059 |

* cited by examiner

TURBOCHARGER WITH AIR JOURNAL BEARING AND THRUST BEARING

GOVERNMENT LICENSE RIGHTS

This invention was made with Government support under contract number FA8650-16-C-2621 awarded by the US Air Force. The Government has certain rights in the invention.

CROSS-REFERENCE TO RELATED APPLICATIONS

None.

BACKGROUND OF THE INVENTION

Field of the Invention

The present invention relates generally to an air bearing, and more specifically to a turbocharger with air journal and air thrust bearings.

Description of the Related Art Including Information Disclosed Under 37 CFR 1.97 and 1.98

The use of unmanned aerial systems (UAS) for high altitude reconnaissance and interdiction has increased demand for improved reciprocating internal combustion (IC) engine fuel efficiency, power-to-weight ratio and reliability. To achieve improved engine power to weight performance, turbochargers are utilized for their ability to provide increased power during take-off and reduced fuel consumption at high altitude cruise. However, turbochargers require coolant and care to ensure the engine lubrication system is not adversely affected by their use.

Traditional turbocharger bearing systems utilize either journal or ball bearings to allow rotational motion of the rotor. These systems are integrated with the IC engine's oil circuit to provide lubrication and cooling during operation. Ball bearing systems require far less oil than journal bearings, and thus results in higher overall turbo system efficiency. However, the ball bearing system is more challenging from a thermal management aspect which strains the oil system. The higher heat loads of a ball bearing system can result in the need for internal oil jets to cool hot surfaces inside the bearing housing. The result is the rate of oil degradation rises rapidly with high oil temperatures. This effect can be detrimental to the IC engine since it relies on the same oil.

Some turbochargers incorporate water cooling in their Center Housing Rotating Assembly (CHRA) which is integrated into the IC engine's cooling system. The main benefit of a water cooled turbo is realized once the engine is shut off and heat from the turbine begins to "soak back". With no oil running through the system, the residual oil and seals are susceptible to damage due to the soak back temperature. Water cooling the CHRA mitigates this risk by passively transferring the heat to the engine's cooling system. Since the engine is no longer running in this condition, the turbo cooling system must rely on buoyancy changes of the coolant to produce adequate coolant flow. As the coolant absorbs heat from the CHRA, the coolant rises allowing new, cooler coolant to enter the CHRA. For this buoyancy effect to work properly, the inlet and outlet coolant lines must maintain a certain constant slope. This can be a difficult requirement to meet in the demanding envelopes of a UAS.

The most challenging task is designing a rotor and air bearing system that can robustly handle the radial loads, thrust loads, thermal loads and the rotor dynamics of a demanding turbocharger. Air bearings tend to have a very low stiffness due to the low viscosity of air. As a result, damping becomes a critical component in the system design due to the fact that the rotor must be able to safely pass through the pitch and bounce modes of vibration.

BRIEF SUMMARY OF THE INVENTION

A turbocharger with a bearing assembly that includes an air journal bearing and an air thrust bearing. The bearing assembly includes a fixed journal bearing on the turbine side of the turbocharger and a floating journal bearing on the compressor side.

The bearing assembly also includes thrust air bearings located on outboard of each journal bearing. The floating bearing is connected to the fixed bearing through a hollow helical spring that supplies compressed air from the fixed journal bearing to the floating journal bearing in series. The fixed and floating thrust bearings both receive compressed air from the same supply in parallel.

A rotor dynamic analysis indicated that the first rigid body mode concentrated the energy on the aft bearing and the second rigid body mode concentrated energy on the forward bearing. A study was performed that showed significant advantages to splitting the bearings into separate components thus allowing each bearing to act upon its damper individually. Since the first rigid body mode concentrates its energy on the aft bearing, and has much lower energy than the first rigid body mode, a design was produced which fixed the aft bearing to the center housing but allows the forward bearing to float independently through soft springs. This design also couples the air supply of both bearings therefore resulting in low air supply leakage.

The air bearings of the present invention are connected to one another through a set of helical springs. The springs can be produced with hollow passages to connect the air supplies. The goal of the design is to make the forward bearing as close to independent as feasible, therefore the springs were designed to be long with thin walls to produce a spring rate that is as compliant as possible.

DETAILED DESCRIPTION OF THE INVENTION

The present invention is turbocharger with a bearing assembly that includes an air journal bearing and an air thrust bearing. The bearing assembly includes a fixed journal bearing on one side of the turbocharger and a floating journal bearing on the other side. Thrust air bearings are located outboard of the journal bearings. The floating bearing is connected to the fixed bearing through a helical hollow coil that also supplies compressed air from the aft journal bearing to the forward journal bearing. The bearing assembly can also be used in a gas turbine engine such as a small gas turbine engine used to power a UAV. Both the turbocharger and the gas turbine engine are considered to be a turbomachine.

Figure 1:
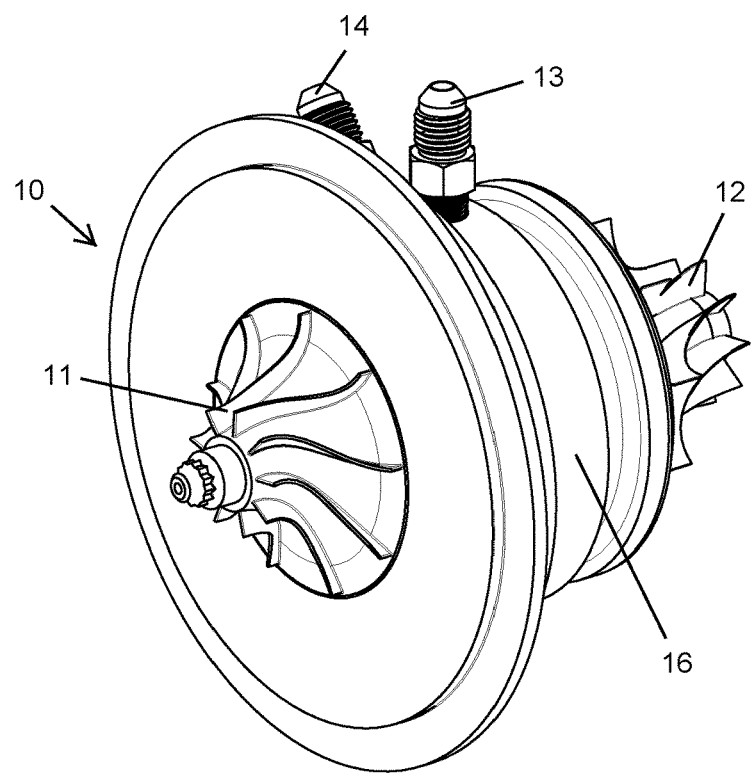
FIG. 1 shows an isometric view of a turbocharger center housing and rotor from a compressor side with the air bearing assembly of the present invention.
Figure 2:
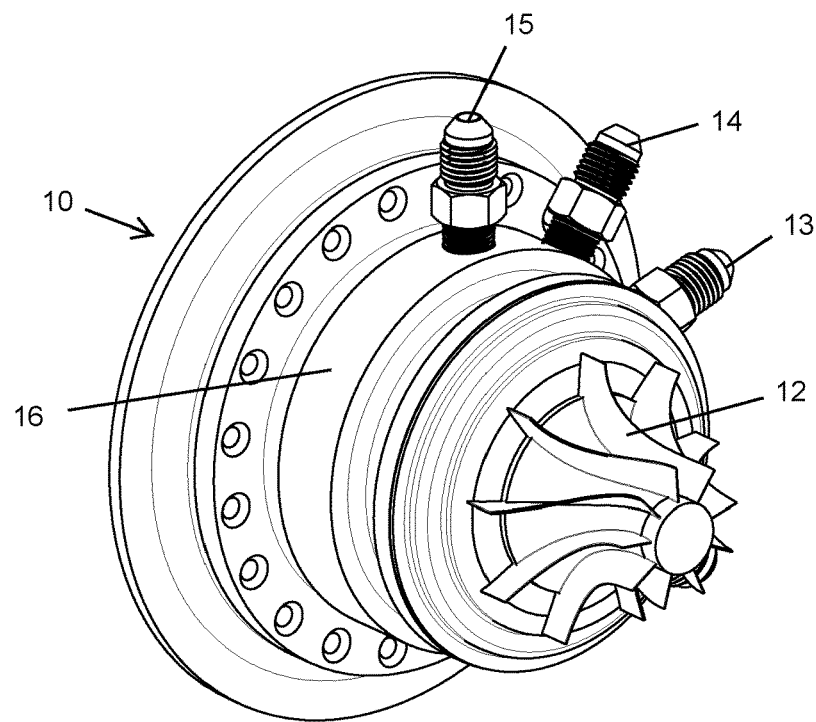
FIG. 2 shows an isometric view of a turbocharger center housing and rotor from a turbine side with the air bearing assembly of the present invention.

The turbocharger with the bearing assembly of the present invention is shown in FIG. 1 from a compressor side and in FIG. 2 from a turbine side. The turbocharger 10 includes a compressor 11 and a turbine 12 connected together by a rotor or shaft 18 within a bearing housing 16. Compressed air supply ports 13 and 14 and air discharge port 15 are spaced around the bearing housing 16 to supply the air for the journal bearings and the thrust bearings. A bearing air discharge or exhaust port 15 is shown in FIG. 2.

Figure 3:
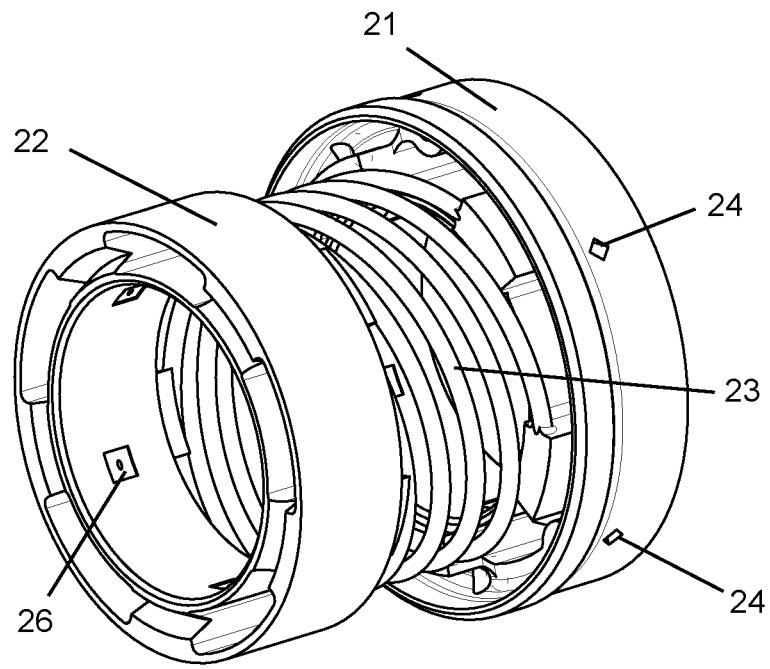
FIG. 3 shows an isometric view of the journal air bearing assembly of the present invention.
Figure 4:
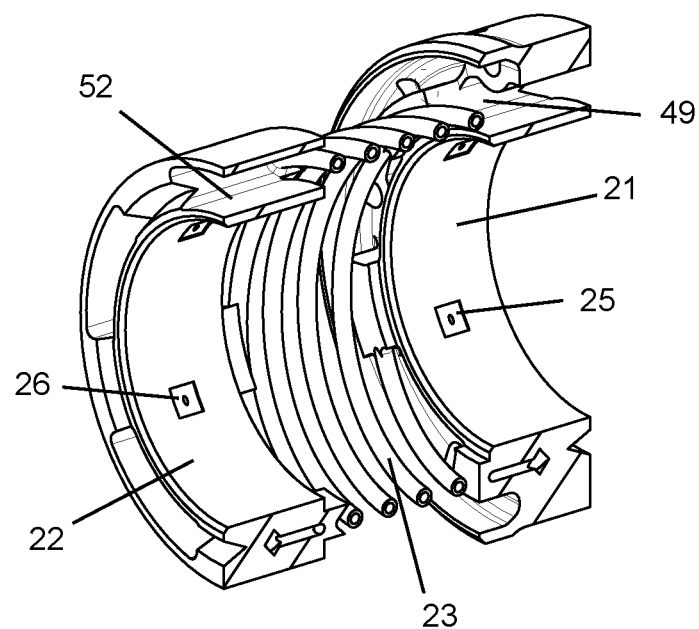
FIG. 4 shows a cutaway view of the journal air bearing of FIG. 3.

FIG. 3 shows a view of the journal bearing assembly that includes an aft journal bearing 21 and a forward journal bearing 22 connected together by a spring 23 that is hollow so as to deliver air from the aft journal bearing 21 to the forward journal bearing 22. FIG. 4 shows a cutaway view of the journal bearing assembly. The aft journal bearing 22 includes a number of pressure pockets 25 and the forward journal bearing 22 also includes a number of pressure pockets 26. The pressure pockets 25 and 26 are connected to the air supply 24 and discharge the air used to form the air cushion between the rotor surface and the stationary bearing inner race.

Figure 5:
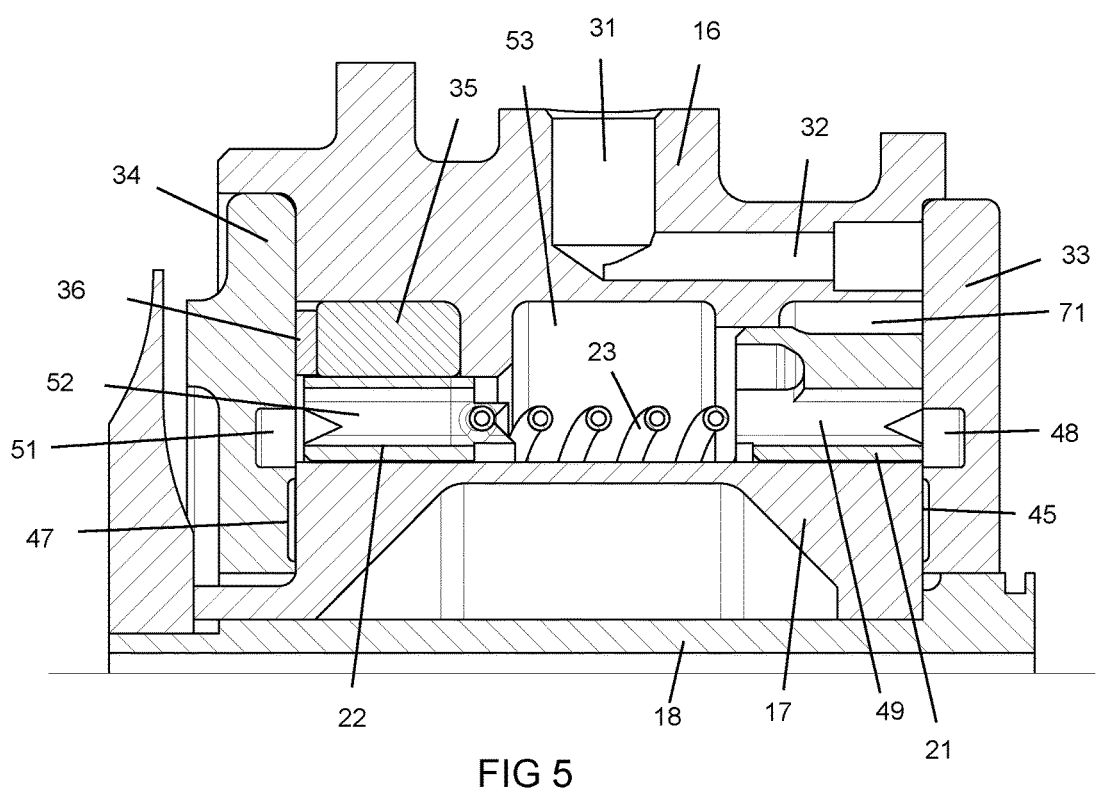
FIG. 5 shows a cross section view of the bearing assembly of the present invention with an aft fixed bearing and a forward floating bearing.

FIG. 5 shows a cross section side view of the bearing assembly with the turbocharger bearing housing 16, the aft journal bearing 21, the forward journal bearing 22, the hollow spring 23 connecting the forward journal bearing 22 to the aft journal bearing 21, a thrust bearing supply pressure port 31, a thrust bearing pressure supply passage 32, a turbine end thrust bearing 33, a compressor end thrust bearing 34, a compressor end bearing damper ring 35, a compression shim 36, a forward thrust bearing cavity 47, an aft thrust bearing cavity 45, a bearing vent cavity 53, an aft bearing return air passage 49, a forward bearing return air passage 52, a forward bearing collection air groove 51, and an aft bearing collection air groove 48. The damper ring 35 is located around the outer diameter of the floating bearing 22 and has a stiffness of around 10× (ten times) the stiffness of the hollow spring 23 and around $1/10^{th}$ the stiffness of the air bearing's pressure film. The two collection air grooves 48 and 51 are semi-annular grooves since the supply air channels 44 and 46 to the thrust bearings must pass through a space between adjacent semi-annular grooves. A rotor sleeve 17 is rotatably fixed to the rotor 18 and forms the rotor surfaces of the two journal bearings and axial faces for the two thrust bearings.

Figure 6:
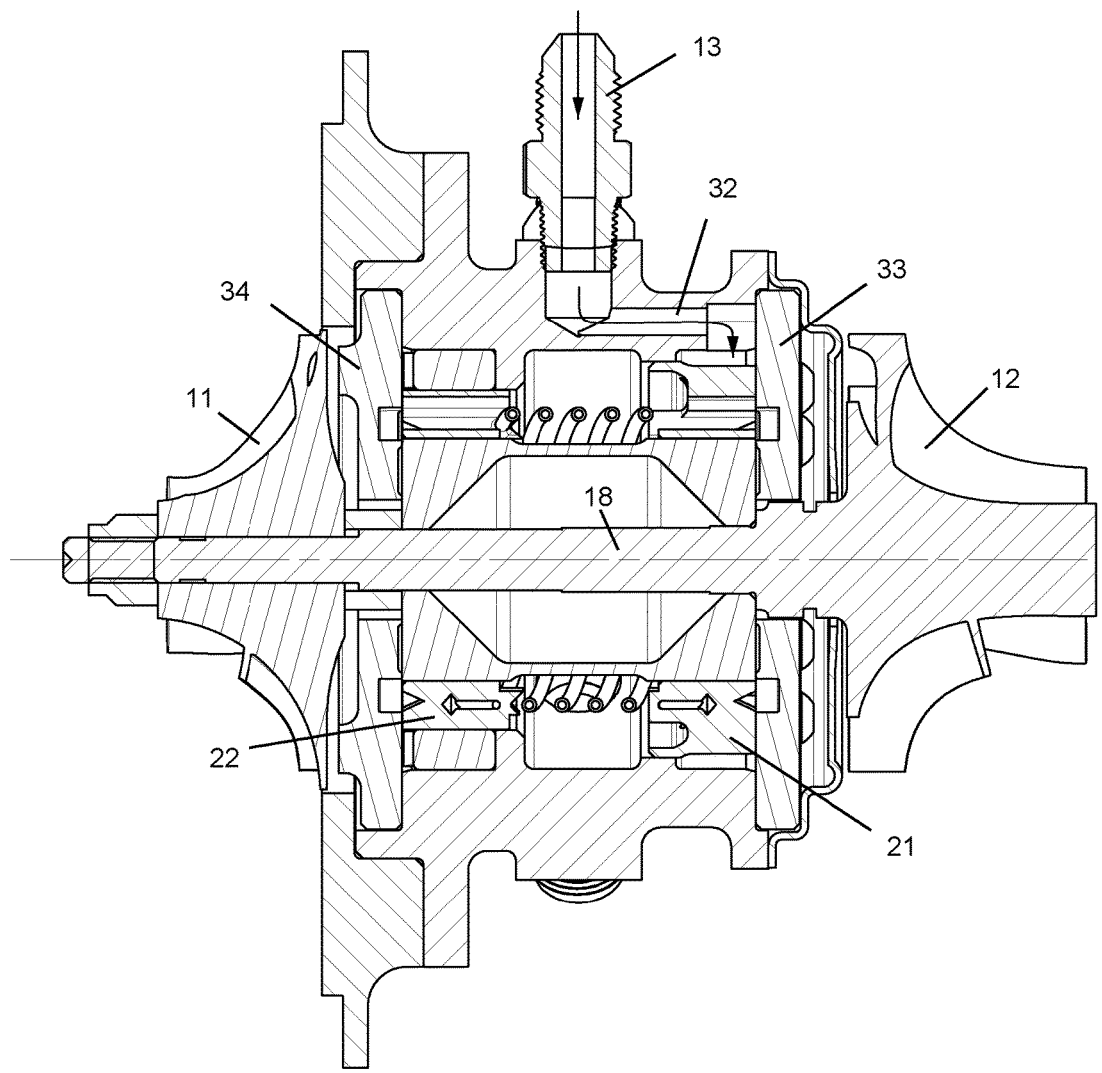
FIG. 6 shows a cross section view of the bearing assembly of the present invention with an air supply passage to the forward journal bearing.

FIG. 6 shows the turbocharger with a bearing supply pressure port 13 and air passage to the aft journal bearing 21. From the inlet port 13, the air flows along an axial passage 32 and then downward through a passage within the aft journal bearing 21 and into the aft journal bearing pockets 25.

Figure 7:
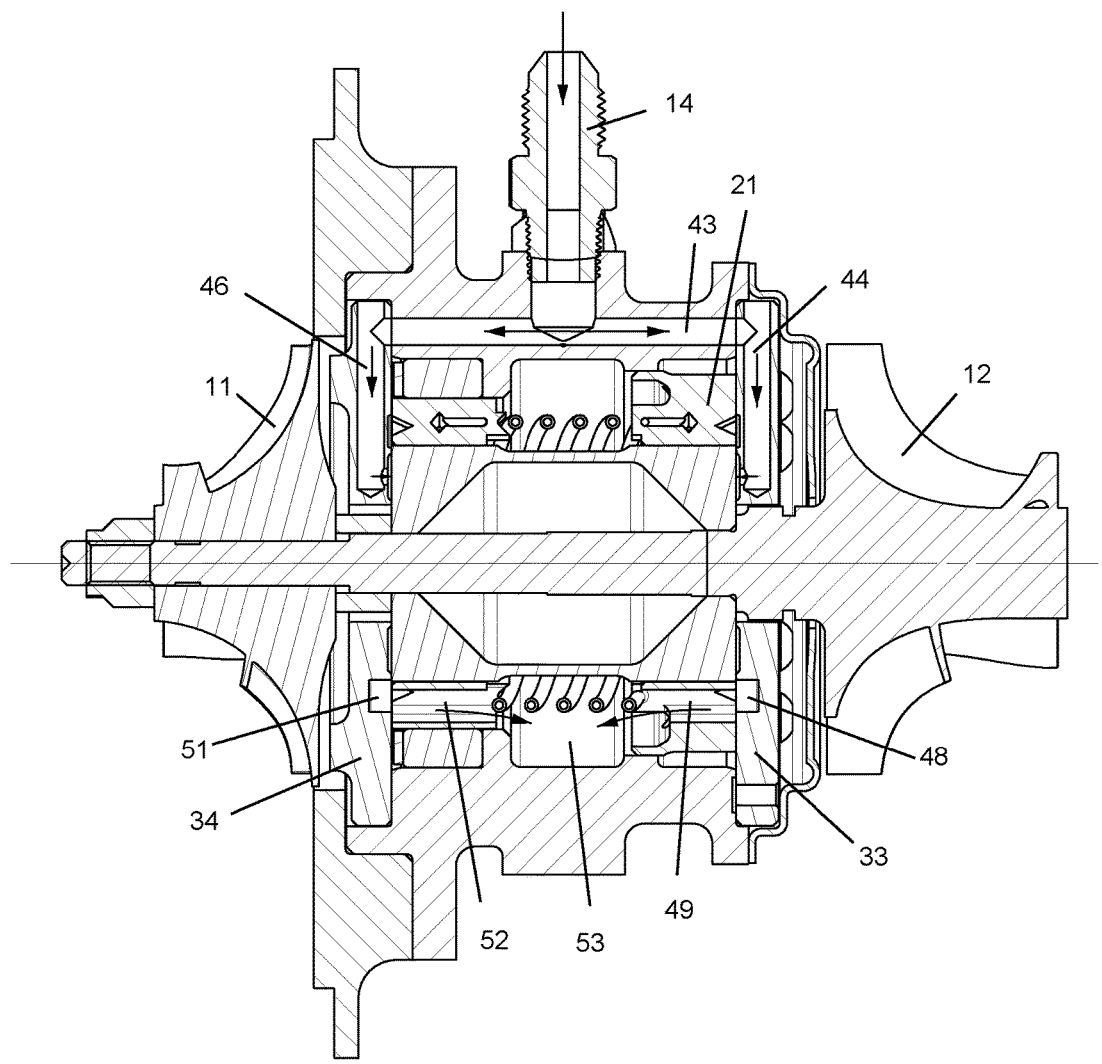
FIG. 7 shows a cross section view of the bearing assembly of the present invention with an air supply passage to both forward and aft thrust bearings and air exhaust passage from both forward and aft thrust bearings.
Figure 8:
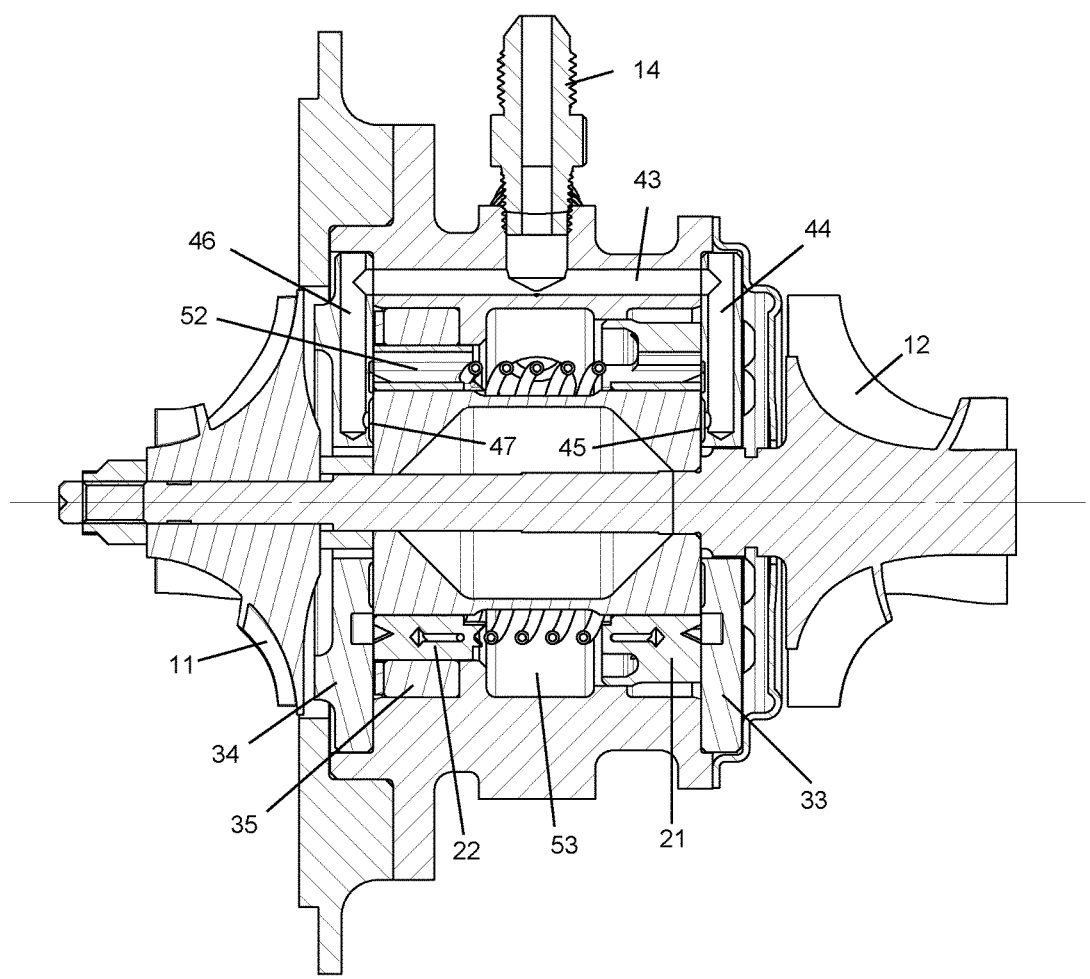
FIG. 8 shows a cross section view through a different section than FIG. 7 of the bearing assembly of the present invention with the air supply passage to both forward and aft thrust bearings and air exhaust passage from both forward and aft thrust bearings.

FIG. 7 shows the turbocharger with a thrust bearing pressure supply port 14 that delivers pressurized air to axial thrust bearing supply passage 43 that leads into aft bearing radial supply passage 44 and forward bearing radial supply passage 46 to deliver the pressurized air to the two thrust bearings in parallel flows. FIG. 7 also shows the bearing air return passages 52 and 49 connected to the collection air grooves 48 and 51 that discharges the bearing air from both bearings into a vent cavity 53. FIG. 8 shows another view similar to FIG. 7 except the return air passages 52 and 49 are above the two bearings in this cross section view.

Figure 9:
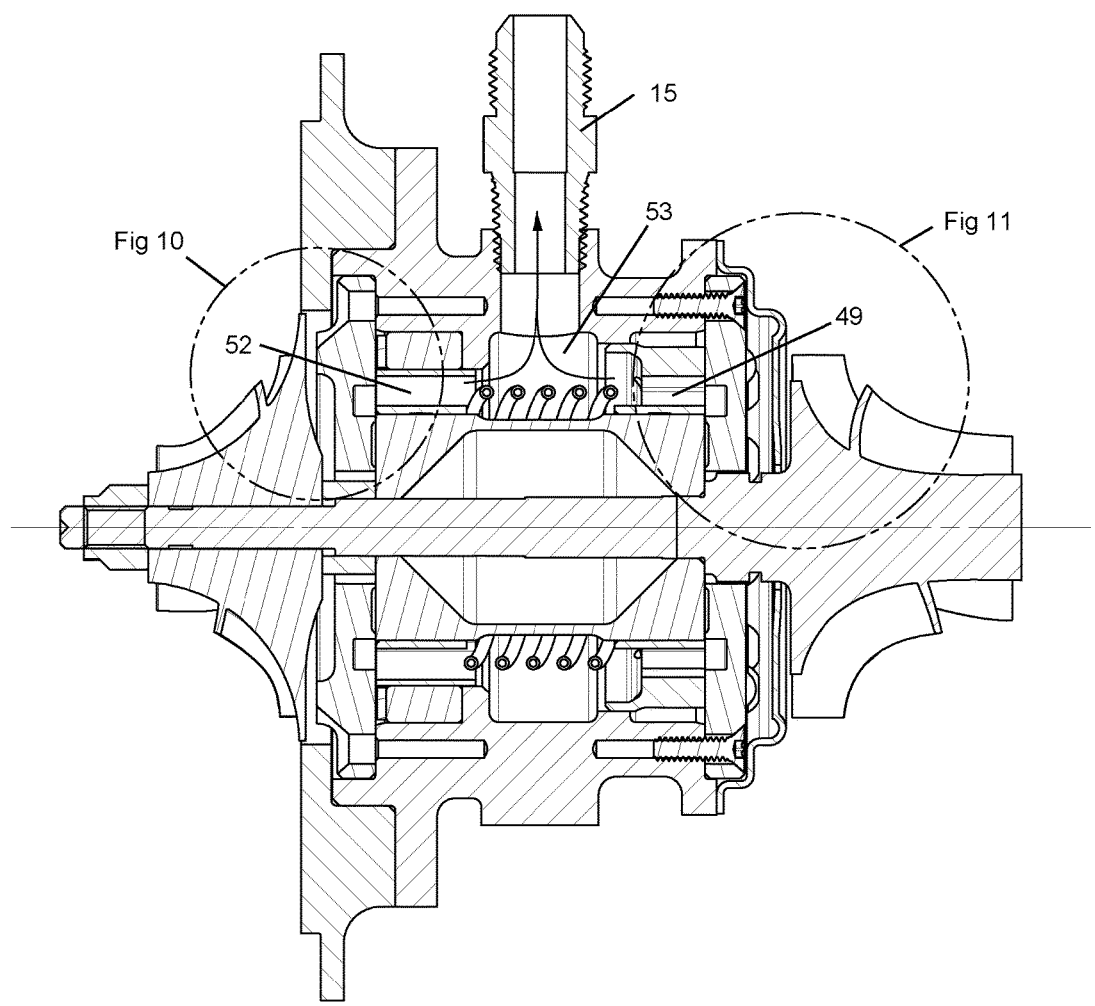
FIG. 9 shows a cross section view of the bearing assembly of the present invention with the air exhaust passage from the aft and forward bearings.
Figure 10:
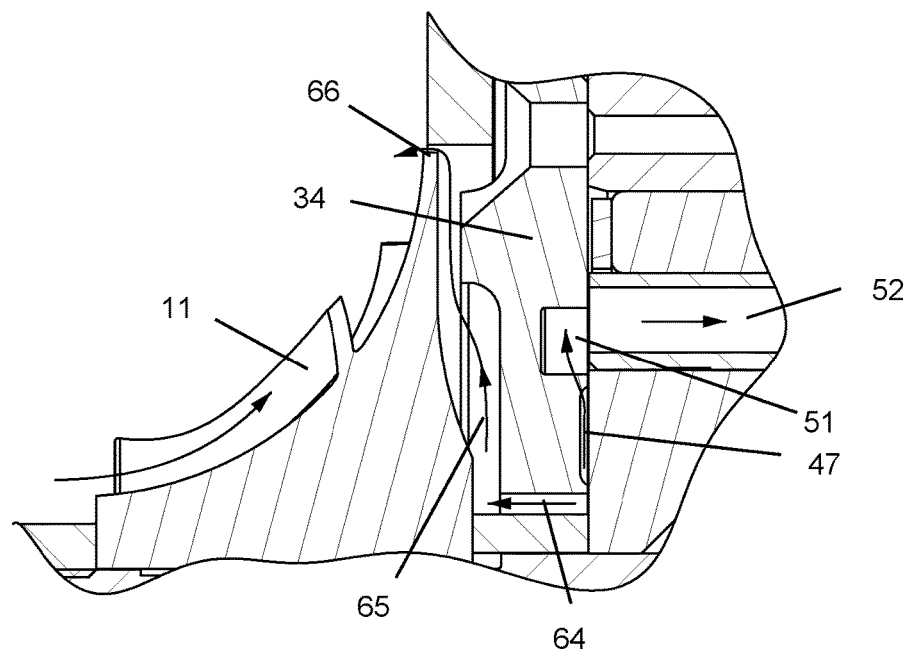
FIG. 10 shows a cross section detailed view of the air flows from the forward thrust bearing of the present invention.
Figure 11:
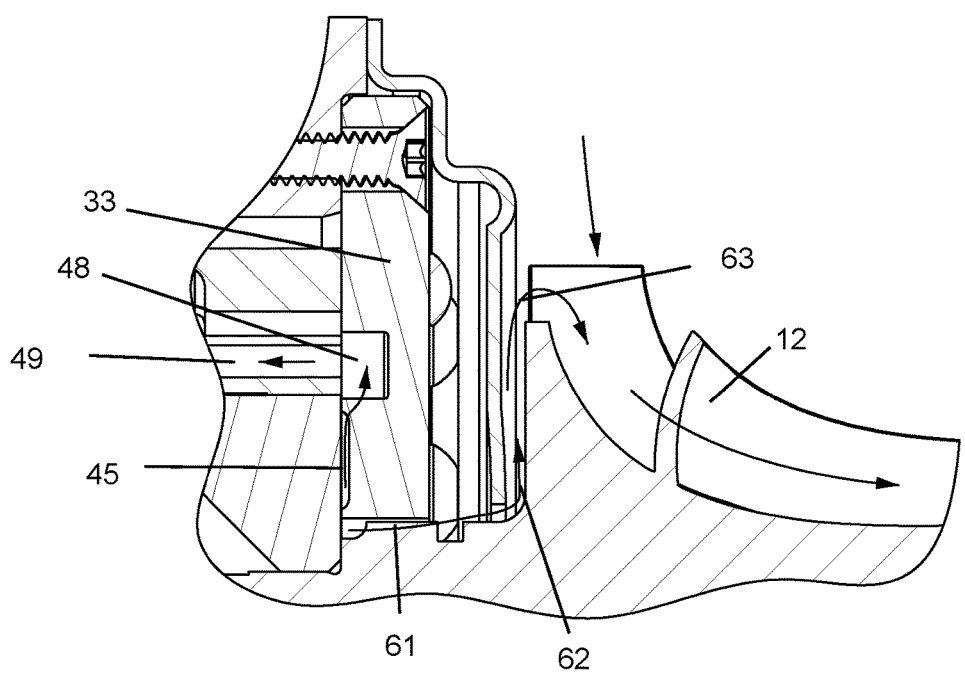
FIG. 11 shows a cross section detailed view of the air flows from the aft thrust bearing of the present invention.

FIG. 9 shows the turbocharger with the air return passages 52 and 49 that open into the vent cavity 53 that is connected to an air discharge port 15. FIG. 10 shows a detailed view of the air flow through the forward thrust bearing cavity 42 in which some of the air flows upward and into the forward bearing collection air groove 51 and then the return air passage 52, while the remaining air flows through passages 64 and 65 and discharges from 66 into the compressor 11 outlet flow. FIG. 11 shows a detailed view of the air flow through the aft thrust bearing cavity 45, where the flow flows upward into the aft bearing collection air groove 48 and then into the return air passage 49, while the remaining air flows through passages 61 and 62 and discharges from 63 into the turbine 12 inlet flow.

Figure 12:
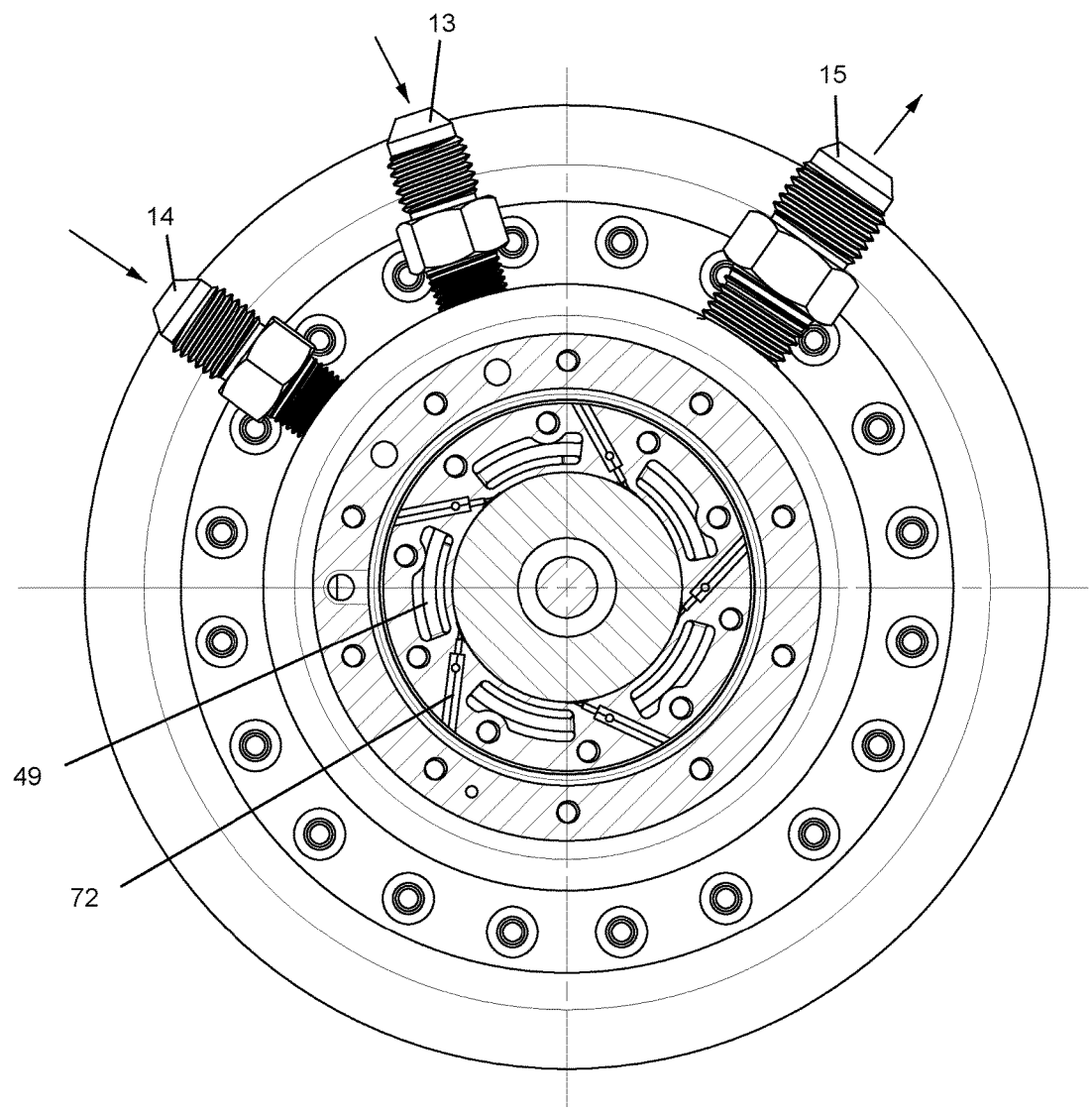
FIG. 12 shows a cross section front view of the bearing assembly of the present invention with the journal bearing passages and the thrust bearing passages.

FIG. 12 shows a cross section front view of the turbocharger through the aft bearing assembly a number of the return air passage 49 in the aft journal bearing 21, and a number of the air supply passages 72 for the aft thrust bearing 45. In this embodiment, there are five return air passages 49 for the journal bearing and five air supply passages 72 for the aft thrust bearing.

Figure 13:
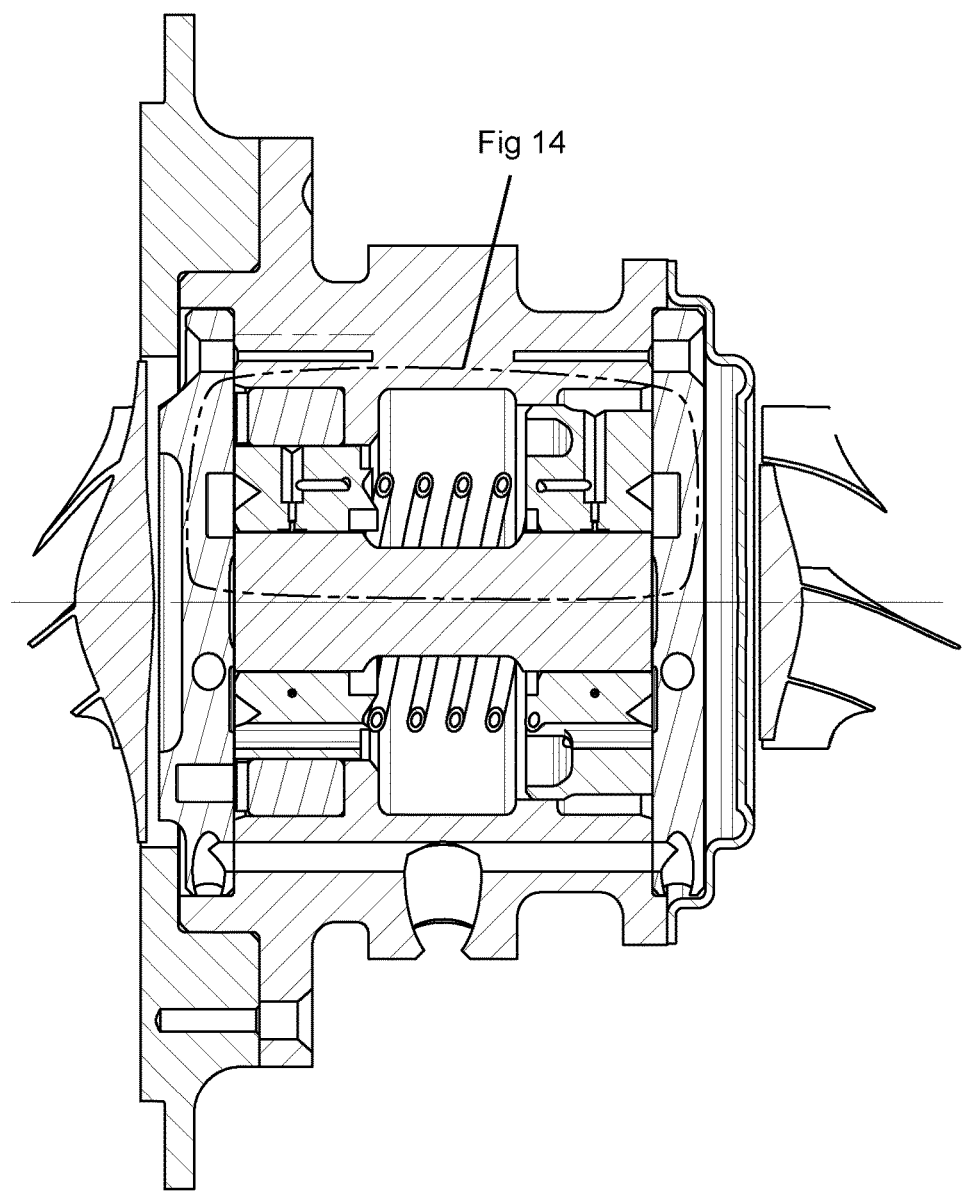
FIG. 13 shows a cross section side view bearing assembly of the present invention with the air supply passages for the thrust bearings.
Figure 14:
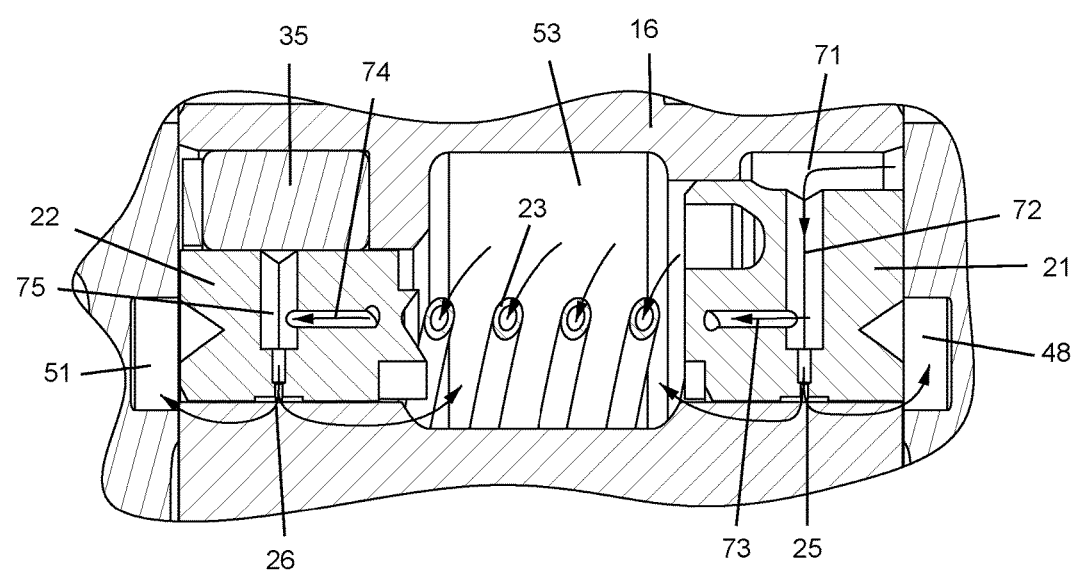
FIG. 14 shows a cross section detailed view of a section of the bearing assembly with the air supply passages for the thrust bearings in FIG. 13.

FIG. 13 shows a cross section view of the forward and aft journal bearings with the supply passages and pressure pockets 25 and 26. FIG. 14 shows a detailed cross section view of the section in FIG. 13 with the aft journal bearing 21 and the forward journal bearing 22 air supply passages. Pressurized air flows into axial passage 71, then into radial passage 72 where the air splits up into two paths with one path to the aft pressure pocket 25 and the second path through passage 73 that leads into the hollow spring 23 to deliver pressurized air to the forward journal bearing 22. The pressurized air from the hollow spring 23 flows into an axial passage 74 and then into a radial passage 75 that opens into the forward pressure pocket 26. Both of the two pressure pockets 25 and 26 will discharge the air flow into the adjacent collection air groove 48 and 51 and into the vent cavity 53. Air flow from the two collection air grooves 48 and 51 flows in the directions as described in FIGS. 10 and 11.

In operation, the rotor of the turbocharger is supported by the two journal bearings and the two thrust bearings using pressurized air supplied from a source outside of the turbocharger. The two thrust bearings are supplied with pressurized air in parallel. The two journal bearings are supplied with pressurized air in series with the aft journal bearing receiving the pressurized air first and then the forward journal bearing second through the hollow spring 23. The air supply to the two bearings is separate from each other. Air from the two journal bearings will flow into the vent chamber 53 or the adjacent collection air grooves 51 or 48. Air from the two thrust bearings 45 and 47 will flow into the adjacent collection air grooves and then into the vent cavity 53 or into the compressor outlet or the turbine inlet as seen in FIGS. 10 and 11. Air from the vent cavity 53 will flow out through the discharge port 15 on the bearing housing 16.

We claim the following:

1. An air journal bearing assembly for a turbomachine comprising:
   a fixed air journal bearing on a rotor;
   a floating air journal bearing on the rotor;
   a hollow spring connecting the fixed air journal bearing to the floating air journal bearing;
   the hollow spring connected to the fixed air journal bearing to support the rotor; and,
   the hollow spring supplies compressed air from the fixed air journal bearing in series with the floating air journal bearing to rotatably support the rotor.

2. The air journal bearing of claim 1, and further comprising:
   the fixed air journal bearing includes a radial compressed air inlet passage for compressed air that opens into a plurality of aft bearing pressure pockets;
   the fixed air journal bearing also includes an axial compressed air passage connected to the radial compressed air inlet passage and to the hollow spring;
   the floating air journal bearing includes a radial compressed air outlet passage connected to a plurality of forward bearing pressure pockets; and,
   the floating air journal bearing also includes an axial compressed air passage connecting the hollow spring to the radial compressed air outlet passage.

3. The air journal bearing of claim 2, and further comprising:
   an air vent cavity located between the floating air journal bearing and the fixed air journal bearing to collect some of the compressed air from the forward bearing and the aft bearing pressure pockets.

4. The air journal bearing of claim 2, and further comprising:
   a forward bearing collection groove adjacent to the forward air journal bearing to collect some of the compressed air from the forward bearing pressure pockets;
   an aft bearing collection groove adjacent to the aft air journal bearing to collect some of the compressed air from the aft bearing pressure pockets;
   a forward bearing return air passage to collect some of the compressed air from the forward bearing pressure pockets;
   an aft bearing return air passage to collect some of the compressed air from the aft bearing pressure pockets; and,
   an air vent cavity located between the floating air journal bearing and the fixed air journal bearing to collect some of the compressed air from the forward bearing and the aft bearing return air passages.

5. The air journal bearing of claim 1, and further comprising:
   a forward air thrust bearing;
   an aft air thrust bearing;
   a forward air thrust bearing compressed air supply passage opening into a forward air thrust bearing cavity;
   an aft air thrust bearing compressed air supply passage opening into an aft air thrust bearing cavity; and,
   a compressed air supply port connected to the forward and aft air thrust bearing compressed air supply passages.

6. The air journal bearing of claim 5, and further comprising:
   a forward bearing compressed air discharge passage connected to the forward air thrust bearing cavity to an outlet of a compressor; and,
   an aft bearing compressed air discharge passage connected to the aft air thrust bearing cavity to an inlet of a turbine.

7. The air journal bearing of claim 1, and further comprising:
   the floating air journal bearing is mounted within an annular damper ring that has a stiffness of substantially ten times a stiffness of the hollow spring.

8. A turbomachine comprising:
   a compressor connected to a turbine through a rotor;
   a housing;
   a forward air journal bearing and a forward air thrust bearing to support the rotor on the compressor side;
   an aft air journal bearing and an aft air thrust bearing to support the rotor on the turbine side;
   the aft air journal bearing being a fixed air journal bearing;
   the forward air journal bearing being a floating air journal bearing; and,
   a hollow spring connecting the fixed air journal bearing to the floating air journal bearing such that compressed air for the floating air journal bearing flows through the hollow spring from the fixed air journal bearing.

9. The turbomachine of claim 8, and further comprising:
   a first compressed air inlet port on the housing and connected to the fixed air journal bearing; and,
   a second compressed air inlet port on the housing and connected in parallel to the forward and the aft air thrust bearings.

10. The turbomachine of claim 9, and further comprising:
    the fixed air journal bearing includes a radial compressed air inlet passage for compressed air that opens into a plurality of aft bearing pressure pockets;
    the fixed air journal bearing also includes an axial compressed air passage connected to the radial compressed air inlet passage and to the hollow spring;
    the floating air journal bearing includes a radial compressed air outlet passage connected to a plurality of forward bearing pressure pockets; and,
    the floating air journal bearing also includes an axial compressed air passage connecting the hollow spring to the radial compressed air outlet passage.

11. The turbomachine of claim 9, and further comprising:
    an air vent cavity located between the floating air journal bearing and the fixed air journal bearing to collect some of the compressed air from the forward bearing and the aft bearing pressure pockets.

12. The turbomachine of claim 8, and further comprising:
    a forward bearing collection groove adjacent to the forward air journal bearing to collect some of the compressed air from the forward bearing pressure pockets;

an aft bearing collection groove adjacent to the aft air journal bearing to collect some of the compressed air from the aft bearing pressure pockets;
a forward bearing return air passage to collect some of the compressed air from the forward bearing pressure pockets;
an aft bearing return air passage to collect some of the compressed air from the aft bearing pressure pockets; and,
an air vent cavity located between the floating air journal bearing and the fixed air journal bearing to collect some of the compressed air from the forward bearing and the aft bearing return air passages.

13. The turbomachine of claim 8, and further comprising:
a forward air thrust bearing;
an aft air thrust bearing;
a forward air thrust bearing compressed air supply passage opening into a forward air thrust bearing cavity;
an aft air thrust bearing compressed air supply passage opening into an aft air thrust bearing cavity; and,
a compressed air supply port connected to the forward and aft air thrust bearing compressed air supply passages.

14. The turbomachine of claim 13, and further comprising:
a forward bearing compressed air discharge passage connected to the forward air thrust bearing cavity to an outlet of a compressor; and,
an aft bearing compressed air discharge passage connected to the aft air thrust bearing cavity to an inlet of a turbine.

15. The turbomachine of claim 11, and further comprising:
an air discharge port on the housing connected to the air vent cavity.

16. The turbomachine of claim 12, and further comprising:
an air discharge port on the housing connected to the air vent cavity.

17. The turbomachine of claim 8, and further comprising:
the floating air journal bearing is mounted within an annular damper ring that has a stiffness of substantially ten times a stiffness of the hollow spring.

* * * * *